Patented Jan. 19, 1954

2,666,708

UNITED STATES PATENT OFFICE 2,666,708

MAINTAINING STABILITY OF VEGETABLE OILS UNDERGOING HEATING

Joseph A. Chenicek, Bensenville, Ill., assignor to Universal Oil Products Company, Chicago, Ill., a corporation of Delaware No Drawing. Application August 9, 1949, Serial No. 109,402

2 Claims. (Cl. 99—163)

This invention relates to a method of maintaining the stability of vegetable oils undergoing heating at an elevated temperature, and more particularly to a method of prolonging the useful life of vegetable oils used in roasting, frying, cooking, etc.

Edible glyceridic oils of vegetable origin appear to be particularly satisfactory for use in frying, roasting or cooking operations such as the roasting of nuts, frying of potato chips, cooking of French fried potatoes, etc. However, after use at elevated temperature, the vegetable oil becomes rancid and, therefore, cannot be satisfactorily used further in the process. The rancid taste and odor of the vegetable oil will be transferred to the material being heated therein. The present invention is directed to a novel method of prolonging the useful life of vegetable oils utilized in this manner.

In one embodiment the present invention relates to a method of maintaining the stability of vegetable oil undergoing heating at an elevated temperature which comprises periodically adding thereto a tertiary-alkyl-4-alkoxyphenol.

In a specific embodiment, the present invention relates to a method of maintaining the stability of hydrogenated cotton seed oil undergoing heating at an elevated temperature which comprises periodically adding thereto 2-tert-butyl-4-methoxyphenol.

The present invention is applicable to the treatment of any vegetable oil undergoing heating at an elevated temperature. Typical representatives of the more generally used vegetable oils include cotton seed oil, soya bean oil, linseed oil, olive oil, rapeseed oil, coconut oil, palm oil, corn oil, peanut oil, babassu oil, etc., as well as the hydrogenated oils. It is understood that oils of vegetable origin which have been subjected to various other treatments are also included within the scope of the present invention.

In general, edible glyceridic oils of vegetable origin are not as receptive to treatment with a tertiary-alkyl-4-alkoxyphenol as are edible oils of animal origin. Thus, for example, while the addition of a tertiary-alkyl-4-alkoxyphenol to lard will increase the stability period three-fold or more times, the addition of the same compound to most vegetable oils will serve to increase the stability period thereof only to a much lower degree. Therefore, the vegetable oil even when treated with a tertiary-alkyl-4-alkoxyphenol introduced prior to use will not be satisfactory for prolonged use at elevated temperature. When an animal fat as, for example, lard is used for roasting, frying or cooking, the addition of a 2-tertiary-alkyl-4-alkoxyphenol thereto will satisfactorily serve to prolong the life of the fat considerably over its original uninhibited life. As hereinbefore set forth, this method is not satisfactory when using vegetable oil, and the present invention offers a novel method of accomplishing the desired result.

The temperature used in the roasting, frying or cooking operation will of course vary with the particular material being treated but, in general, will be within the range of from about 250° F. to about 450° F. Under these conditions uninhibited vegetable oils or even vegetable oils to which a tertiary-alkyl-4-alkoxyphenol has been added initially will lose stability and become rancid in a comparatively short period of time. As hereinbefore set forth, the present invention provides a novel method of maintaining the stability of the vegetable oil and thereby prolonging its useful life.

As hereinbefore set forth, the addition agent of the present invention comprises a tertiary-alkyl-4-alkoxyphenol and preferably a 2-tertiary-alkyl-4-alkoxyphenol. Preferred compounds include 2 - tertiary - butyl - 4 - methoxyphenol, 2 - tertiary - butyl - 4 - ethoxyphenol, 2 - tertiary - butyl - 4 - propoxyphenol, 2 - tertiary-butyl - 4 - butoxyphenol, 2 - tertiary - amyl-4 - methoxyphenol, 2 - tertiary - amyl - 4-ethoxyphenol, 2 - tertiary - amyl - 4 -propoxyphenol, 2 - tertiary - amyl - 4 - butoxyphenol, 2 - tertiary - hexyl - 4 - methoxyphenol, 2-tertiary - hexyl - 4 - ethoxyphenol, 2 - tertiary-hexyl - 4 - propoxyphenol, 2 - tertiary - heptyl-4 - methoxyphenol, 2 - tertiary - heptyl - 4-ethoxyphenol, 2 - tertiary - heptyl - 4 -propoxyphenol, 2 - tertiary - octyl - 4 - methoxyphenol, 2 - tertiary - octyl - 4 - ethoxyphenol, 2 - tertiary - octyl - 4 - propoxyphenol, 2 - tertiary-nonyl - 4 - methoxyphenol, 2 - tertiary - nonyl-4 - ethoxyphenol, 2 - tertiary - nonyl - 4 - propoxyphenol, etc. It is understood that these compounds are not necessarily equivalent but that all of them will serve to prolong the life of the vegetable oil used in the manner herein set forth.

The amount of tertiary-alkyl-4-alkoxyphenol to be added will depend upon the particular vegetable oil being used, upon the particular food product being subjected to roasting, frying or cooking, and upon the temperature of such heating. In general, however, the tertiary-alkyl-4-alkoxyphenol will be added to the vegetable oil at the start of the operation in an amount of from about 0.001% to about 0.5% or more, and additional tertiary-alkyl-4-alkoxyphenol will be added periodically during the roasting, frying or cooking process to compensate for tertiary-alkyl-4-alkoxyphenol lost by way of volatilization or absorption by the material being roasted, fried or cooked. The time for periodic addition of more tertiary-alkyl-4-alkoxyphenol will vary as hereinbefore set forth. This readily can be ascertained by withdrawing a sample of the vegetable oil and determining the stability period thereof which generally is more easily accomplished than to analyze for the amount of tertiary-alkyl-4-alkoxyphenol contained in the vegetable oil.

2-tertiary-alkyl-4-alkoxyphenols are particularly adapted for use in vegetable oils subjected to high temperature. Experiments have demonstrated that 2-tertiary-butyl-4-methoxyphenol, for example, can withstand heating to high temperature without undergoing decomposition or loss in potency. Further, this inhibitor has the unique property of carrying into the cooked, fried, or roasted material and thereby will also serve to lengthen the stability period before the material becomes rancid.

The following examples are introduced to illustrate further the novelty and utility of the present invention but not with the intention of unduly limiting the same.

25,373 pounds of Virginia peanuts were split into two batches and each batch was separately roasted in an initial charge of approximately 550 pounds of separate portions of hydrogenated cotton seed oil. 50 grams of an inhibitor mixture comprising approximately 80% of 2-tertiary-butyl-4-methoxyphenol and about 20% of 3-tertiary-butyl-4-methoxyphenol were added to one of the portions of hydrogenated cotton seed oil, thus making an inhibitor concentration of 0.02% by weight. No inhibitor was added to the other portion of cotton seed oil. In both vats the peanuts were roasted at a temperature of 310° F. As the operations proceeded, the oil was tested as to peroxide number. As the oil was lost during the roasting operation, it was replaced by fresh oil. The fresh oil which was added to the vat containing the inhibited oil also contained the same inhibitor composition in an amount of 0.02% by weight plus an additional 2½ grams per vat to make up for loss of inhibitor. The replacement oil containing additional inhibitor was added at several times during the roasting operation. In all, a total of 147 grams of inhibitor were added to the oil during the operation. The total amount of oil used for both vats amounted to 2,802 pounds, of which 81 pounds were recovered as drippings and 1,055 pounds remained in the vats at the conclusion of the operation.

The hydrogenated cotton seed oil before use had a stability period of approximately 42 hours, and upon the addition of 0.02% by weight of the inhibitor composition, the stability period was increased to 46 hours. It will be noted that the stability period of this particular vegetable oil was increased only by about 4 hours with this particular inhibitor composition. As hereinbefore set forth, this increase in stability period is much lower than is normally obtained with fats of animal origin. The stability period of vegetable oils is defined as the number of hours until the oil reaches a peroxide number of 100 as determined by the Swift test, which is described in detail in the article by A. E. King, H. L. Roschen and W. H. Erwin, which appeared in the Oil & Soap, vol. 10, No. 6, pages 105–109 (1933). In general, this test comprises bubbling air through a sample of the oil until rancidity is determined by peroxide values and organoleptically. This test is also referred to as the active oxygen method.

The results of this operation are reported in the following table which shows the stability periods of the original oil, the oil plus inhibitor composition at the start of the run, after 5 days of operation, and after 29 days of operation.

TABLE

| Vat | Stability Period in Hours | | |
|---|---|---|---|
| | At Start of Run | After 5 Days | After 21 Days |
| No inhibitor (control) | 42 | 23 | 20 |
| With inhibitor added at start of run and periodically during run | 46 | 43 | 41 |

It will be noted from the data in the above table that the control vat containing no inhibitor decreased in stability from 42 hours at the start, to 23 hours after 5 days and to less than 20 hours after 21 days at which time the operation was discontinued because the oil became unsuitable for further use. On the other hand, the oil which contained inhibitor introduced at the start and periodically during the run had a stability period of 46 hours at the start of the run, 43 hours after 5 days of operation and 41 hours after 21 days of operation. It is readily apparent that the hydrogenated cotton seed oil to which the inhibitor was added at the start and periodically during the run is still of a sufficiently high stability period to be used for the further roasting of peanuts, whereas the hydrogenated cotton seed oil without inhibitor had become rancid to a stability period of less than 20 hours and, therefore, could not be used further for the roasting of peanuts.

I claim as my invention:

1. In roasting, frying and cooking operations, the method of maintaining the stability of vegetable oil utilized therein which comprises adding a tertiary-alkyl-4-alkoxyphenol to said vegetable oil in an amount of from about 0.001% to about 0.5% prior to the operation, and during the operation adding vegetable oil to compensate for the vegetable oil lost during the operation, the added vegetable oil containing a percentage amount of tertiary-alkyl-4-alkoxyphenol in excess of that added at the start of the operation in order to likewise compensate for the tertiary-alkyl-4-alkoxyphenol lost during the operation.

2. The method of claim 1 further characterized in that said alkoxyphenol is 2-tertiary-butyl-4-methoxyphenol.

JOSEPH A. CHENICEK.

References Cited in the file of this patent

UNITED STATES PATENTS

| Number | Name | Date |
|---|---|---|
| 2,459,540 | Rosenwold | Jan. 18, 1949 |
| 2,485,635 | Neal et al. | Oct. 25, 1949 |
| 2,517,765 | Coffey et al. | Aug. 8, 1950 |

OTHER REFERENCES

Kraybill et al., Studies on Autioxidants, Bull. No. 2, April 1948. Am. Meat Inst. Found.